I. NIEMI.
MULTIPLE HORSE HOLDER AND RELEASER.
APPLICATION FILED SEPT. 11, 1916.

1,267,582.

Patented May 28, 1918.

Witness:
C. Dade
Grace Thompson

Inventor:
I. Niemi
By H. J. Sanders
attorney.

UNITED STATES PATENT OFFICE.

ISAAC NIEMI, OF CHATHAM, MICHIGAN, ASSIGNOR OF ONE-FOURTH TO JOHN F. MAKI, OF CHATHAM, MICHIGAN.

MULTIPLE HORSE HOLDER AND RELEASER.

1,267,582.  Specification of Letters Patent.  Patented May 28, 1918.

Application filed September 11, 1916. Serial No. 119,583.

*To all whom it may concern:*

Be it known that I, ISAAC NIEMI, a subject of the Czar of Russia, residing at Chatham, in the county of Alger, in the State of Michigan, have invented certain new and useful Improvements in Multiple Horse Holders and Releasers, of which the following is a specification.

This invention relates to improvements in multiple horse holders and releasers and its object is to produce a device of this class adapted primarily for use in stables where a number of animals are housed in a series of stalls; the invention being so constructed and arranged as to provide means for normally holding all of the animals and for, in case of necessity, releasing them simultaneously. With the foregoing and other objects in view the invention consists in the combination and arrangement of parts to be hereinafter fully described in this specification, pointed out in the appended claim and illustrated in the accompanying drawing which forms a part of the specification and in which—

Like reference characters denote corresponding parts throughout the several views.

Figure 1:
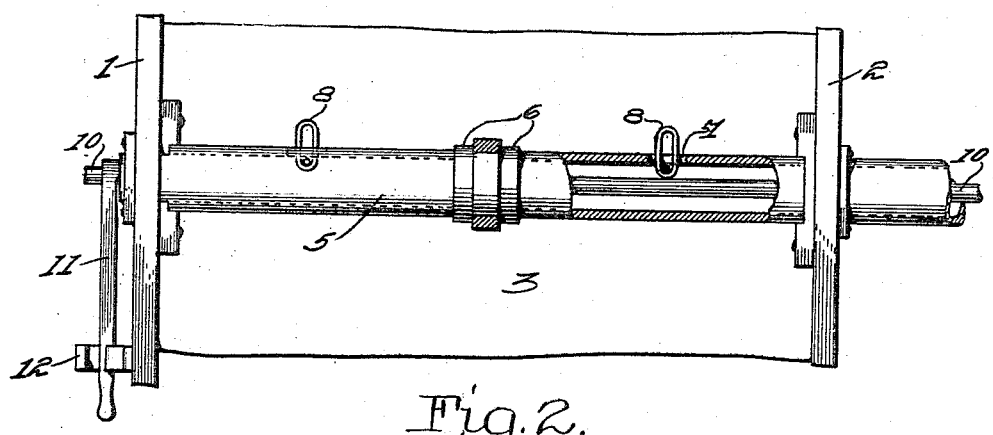
Figure 1 is a view in front elevation partly in section, illustrating the application of my invention.
Figure 2:
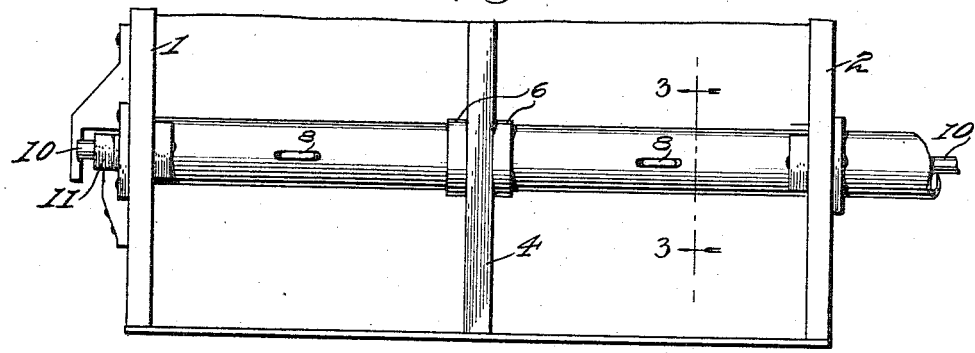
Fig. 2 is a top plan view of Fig. 1.
Figure 3:
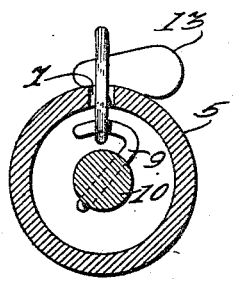
Fig. 3 is a section taken on line 3—3 of Fig. 2.

The reference numeral 1 denotes one end wall of a stable and 2 an interior partition. The stall 3 between the members 1 and 2 is divided into apartments by the beams 4. A tubular casting 5 extends through the several stalls of the stable and is secured in bearings 6 and is formed in each apartment of each stall with an elongated aperture 7 in which a hitching ring 8 is disposed that normally is engaged by a hooked pin 9 which runs through and is carried by the longitudinally extending rotary shaft 10 which is supported in approximately the longitudinal central portion of the said casting 5.

One end of the said shaft 10 extends through the end wall 1 of the stable and carries a lever 11 normally retained in the keeper 12 secured to said end wall 1.

The animal in each apartment of each stall is hitched to the ring 8 and may be released therefrom by releasing his hitching strap from said ring. To release the several animals in the several stall-apartments simultaneously the operator from outside the stable disengages the lever 11 from its keeper 12 and moves it in a direction to cause the shaft 10 to rotate in a manner to effect the disengagement of the several hooked pins 9 from the hitching rings 8. To re-assemble the device the operator enters each stall-apartment and places a wedge 13, of a shape to conform to the shape of the periphery of the casting, in engagement with each hitching ring 8 to support the same in such manner that it will extend partially into the casting 5. He then goes outside the stable and moves the lever 11 back to its original position thus repositioning the hooks 9 and causing them to again pick up the rings 8 when the several wedges 13 may be removed from engagement with the hitching rings.

What is claimed is:

In a multiple horse holder and releaser, an apertured tubular casting, a rotary shaft extending centrally and longitudinally of said casting, hooked pins carried by said rotary shaft diametrically opposite the apertured portions of said casting, hitching rings normally disposed in the apertured portions of said casting for releasable engagement with the said hooked pins, means for actuating said rotary shaft, and wedges adapted to temporarily support said hitching rings in the apertured portions of said tubular casting.

In testimony that I claim the foregoing as my own I have hereto affixed my signature in the presence of two subscribing witnesses.

ISAAC NIEMI.

Witnesses:
 JOHN MATERO,
 JNO. H. GATISS.

Copies of this patent may be obtained for five cents each, by addressing the "Commissioner of Patents, Washington, D. C."